No. 632,410. Patented Sept. 5, 1899.
F. HANCOCK.
JAR OR OTHER RECEPTACLE.
(Application filed Mar. 21, 1899.)

(No Model.) 2 Sheets—Sheet 1.

Witnesses
F. S. Belt.
Marcus L. Byng.

Inventor
Frederick Hancock
by his Attys
Mason Fenwick

No. 632,410.  
F. HANCOCK.  
JAR OR OTHER RECEPTACLE.  
(Application filed Mar. 21, 1899.)  
Patented Sept. 5, 1899.
(No Model.)  
2 Sheets—Sheet 2.
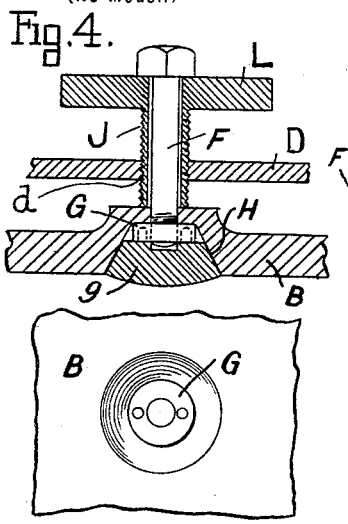
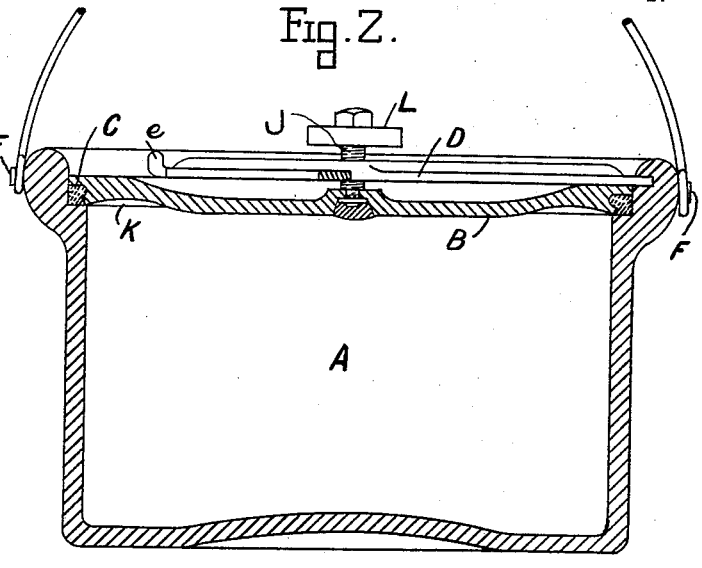
Witnesses  
F. S. Belt,  
Marcus L. Byng.
Inventor  
Frederick Hancock  
by his Attys  
Mason Fenwick Lawrence

UNITED STATES PATENT OFFICE.

FREDERICK HANCOCK, OF STOKE-UPON-TRENT, ENGLAND.

JAR OR OTHER RECEPTACLE.

SPECIFICATION forming part of Letters Patent No. 632,410, dated September 5, 1899.

Application filed March 21, 1899. Serial No. 709,948. (No model.)

*To all whom it may concern:*

Be it known that I, FREDERICK HANCOCK, a subject of the Queen of Great Britain, residing at Stoke-upon-Trent, in the county of Stafford, England, have invented certain new and useful Improvements in or Relating to Jars or other Receptacles, of which the following is a specification.

This invention relates to jars and other receptacles where the lids are required to be held tightly on their seats and when in use prevent the exhalation of odors and gases and the entrance of air.

The invention will be understood from the following description, reference being had to the accompanying drawings, in which—

Figure 1:
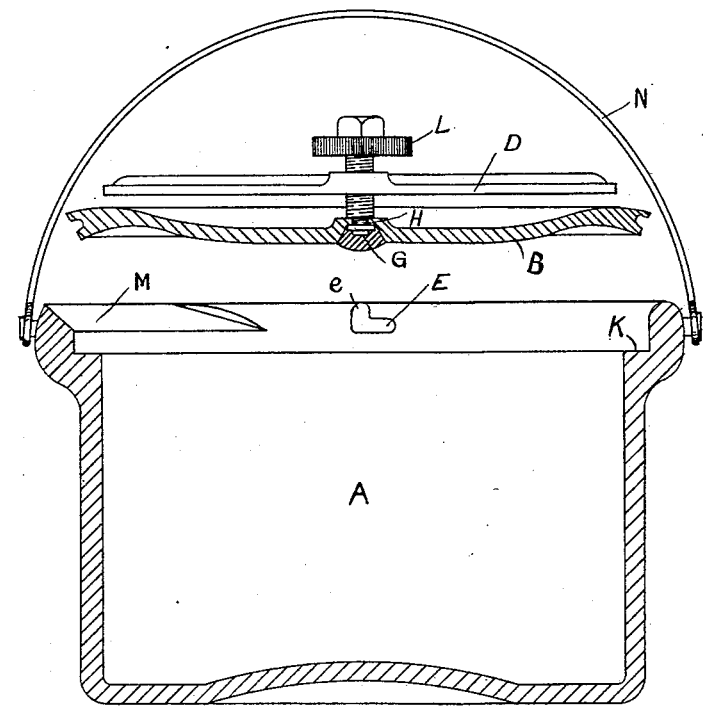
Figure 2:
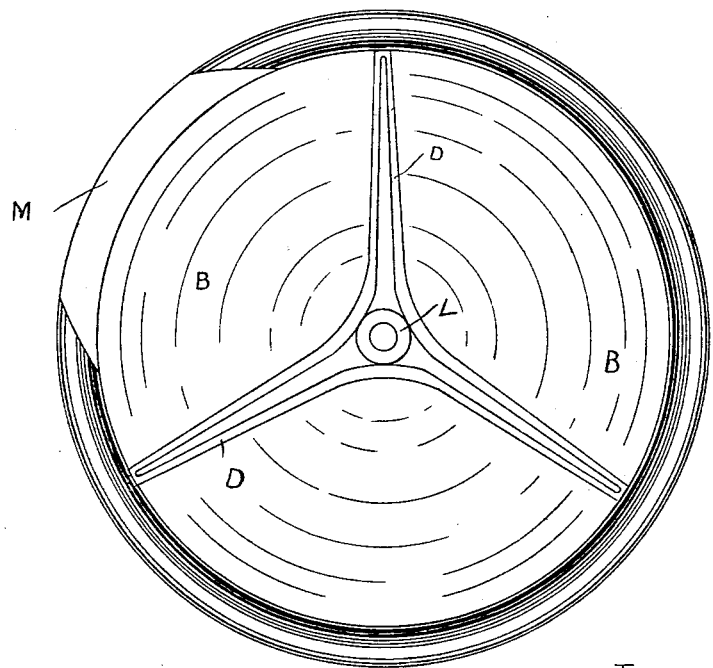

Figure 1 is a cross-section of a jar with the lid lifted; Fig. 2, a similar view with the lid closed; Fig. 3, a plan view thereof; Fig. 4, an enlarged detail view in section, showing the manner of pivoting the rotatable frame D onto the lid; and Fig. 5, an underneath plan thereof.

Referring to Figs. 1 to 5, inclusive, I provide an earthenware jar or vessel A of any suitable shape and an earthenware lid B, with india-rubber seating-washer C, adapted to close the jar or vessel in an air-tight manner. This lid is held firmly on its seat by pressure applied by means of a rotatable frame D, with radial arms pivoted at *d* on top of lid. The extremities of these arms engage in short grooves E on the inside of the neck of the jar A, the grooves each having a vertical notch *e* to allow of the ends of the frame-arms on the lid being withdrawn when it is required to open the jar.

The plan I prefer for pivoting the frame aforesaid on the lid is as follows: I provide a pin F, screwed at one end to receive a nut G, which nut enters a recess or socket H, formed in the earthenware lid B, and when screwed home locks the pin in place in the lid, an earthenware plug *g* being afterward cemented in the space left in the socket H. On the pin F, I place a rotatable sleeve J, threaded on the outside, and onto this sleeve I screw a frame D, with the radial arms. In order, therefore, to close the jar or vessel and make a tight joint, the lid B is placed on its seat K and the radial arms and the frame rotated, so as to engage in the vertical grooves E on the inside of the neck. By turning the screw in one direction by means of the milled head L, fixed on the end of the screw F, the frame D will be raised and the ends of the radial arms made to abut firmly against the top of the grooves E, thus pressing down the lid onto its seat and closing the jar in an air-tight manner. The rotation of the milled head L in the reverse direction releases the arms from abutting against the grooves.

I chamfer the neck of the vessel at M, so as to enable the user to more easily decant the contents, this chamfer being placed just short of two of the grooves E to prevent the contents of the vessel from lodging in the grooves when emptying, thus giving a clear outlet free from any obstruction. This is an important feature, or otherwise the contents would lodge in the grooves when emptying and cause much difficulty in cleaning. The rubber seating-ring C is placed in a groove in the neck and may be fastened in place by screws, if so desired.

The jar may be provided with a handle N, the pivots to which the handle is pivoted being fixed in the jar by the same method as the pivot-pin F of the frame aforesaid.

It is obvious that my invention can be applied to all classes of vessels where it is desired to hold the lids on very tightly and closely.

I claim as my invention—

The combination with a suitable hollow body portion having bayonet-shaped slots near its upper edge, of a cover or lid, a vertical and centrally arranged pin secured in said lid, a rotatable sleeve on said pin, said sleeve being exteriorly screw-threaded, a rotatable frame having radial arms, said frame being applied on the said sleeve, the outer ends of the radial arms being adapted to enter the bayonet-shaped slots whereby upon turning the sleeve the lid will be forced to its seat and held in such position by the arms bearing against the under side of the bayonet-shaped slots, substantially as described.

In witness whereof I have hereunto signed my name, this 10th day of March, 1899, in the presence of two subscribing witnesses.

FREDERICK HANCOCK.

Witnesses:
  JOSEPH I. ROYDER,
  W. H. BEESTON.